(12) United States Patent
Griggs et al.

(10) Patent No.: US 12,296,668 B2
(45) Date of Patent: May 13, 2025

(54) SYSTEM AND METHOD FOR EXHAUST GAS CONDITIONING

(71) Applicant: Echeneidae Inc., Wixom, MI (US)

(72) Inventors: David Griggs, Chicago, IL (US); Eric Harding, Detroit, MI (US)

(73) Assignee: ECHENEIDAE INC., Wixom, MI (US)

( * ) Notice: Subject to any disclaimer, the term of this patent is extended or adjusted under 35 U.S.C. 154(b) by 0 days.

(21) Appl. No.: 18/169,944

(22) Filed: Feb. 16, 2023

(65) Prior Publication Data

US 2023/0256812 A1    Aug. 17, 2023

Related U.S. Application Data

(60) Provisional application No. 63/391,140, filed on Jul. 21, 2022, provisional application No. 63/310,903, filed on Feb. 16, 2022.

(51) Int. Cl.
*B60K 13/04* (2006.01)
*F01N 3/00* (2006.01)

(52) U.S. Cl.
CPC .............. *B60K 13/04* (2013.01); *F01N 3/005* (2013.01)

(58) Field of Classification Search
CPC .......... F01N 3/005; F01N 3/0205; F01N 3/02; F01N 3/08; F01N 3/0885; F01N 3/0857; F01N 2240/22; B60K 13/04; B01D 53/00; B01D 53/02; B01D 53/04; B01D 53/14; B01D 53/1406; B01D 53/30; B01D 53/34; B01D 53/62; B01D 53/0423; B01D 2258/01; B01D 2258/012; B01D 2259/401; F25J 3/062; F25J 3/0635; F25J 3/0695;

(Continued)

(56) References Cited

U.S. PATENT DOCUMENTS 3,613,334 A    10/1971  Renzo
3,748,830 A *   7/1973  Ross .................... B01D 50/00
                                                    95/290

(Continued)

OTHER PUBLICATIONS

PCT, Notification of Transmittal of The International Search Report and The Written Opinion of The International Searching Authority, or The Declaration for Application PCT/US23/13197 dated May 26, 2023.

*Primary Examiner* — Kenneth J Hansen
*Assistant Examiner* — Kelsey L Stanek
(74) *Attorney, Agent, or Firm* — Fredrikson & Byron, P.A.

(57) ABSTRACT

A method and conditioning system for conditioning exhaust gas are provided. The conditioning system includes one or more heat removal systems for removing heat from an exhaust gas. The conditioning system also includes a condensate removal system fluidly coupled with, and positioned downstream of, the one or more heat removal systems. The condensate removal system is operable to remove moisture from the exhaust gas. In some variants, the conditioning system further includes one or more fluid chambers fluidly coupled with, and positioned downstream of, the condensate removal system. Each fluid chamber defines an interior in which a capture medium is contained. The cooled, moisture-depleted exhaust is selectively distributed to the fluid chambers to allow for harvesting or capture of a set of target species from the exhaust gas.

18 Claims, 8 Drawing Sheets

(58) Field of Classification Search
CPC .... F25B 9/002; F25B 1/00; F25B 1/08; F25B 2400/121; F25B 7/00; F25B 27/02
USPC ......... 60/272; 62/618, 160, 114, 509, 238.6, 62/335, 500
See application file for complete search history.

(56) References Cited

U.S. PATENT DOCUMENTS

| | | | |
|---|---|---|---|
| 6,893,615 B1* | 5/2005 | Alexander | B01D 53/92 422/177 |
| 2005/0084415 A1* | 4/2005 | McVey | B67C 7/0073 422/298 |
| 2012/0045378 A1 | 2/2012 | Soukhojak et al. | |
| 2013/0186448 A1* | 7/2013 | Ranalli | F01N 3/2013 60/272 |
| 2013/0298599 A1* | 11/2013 | Stallmann | F25J 3/08 62/617 |
| 2016/0059180 A1* | 3/2016 | Hamad | F01N 3/0857 423/212 |
| 2022/0010707 A1* | 1/2022 | Sharma | F01N 3/0857 |

* cited by examiner

SYSTEM AND METHOD FOR EXHAUST GAS CONDITIONING

CROSS REFERENCE TO RELATED APPLICATIONS

The present application claims the benefit of U.S. Provisional Patent Application Ser. No. 63/310,903, filed on Feb. 16, 2022, entitled "SYSTEM AND METHOD FOR EXHAUST GAS DEHUMIDIFICATION," and U.S. Provisional Patent Application Ser. No. 63/391,140, filed on Jul. 21, 2022, entitled "SYSTEM AND METHOD FOR EXHAUST GAS CONDITIONING," each of which is incorporated herein by reference in its entirety.

TECHNICAL FIELD

This invention relates generally to the carbon capture field, and more specifically to a new and useful conditioning system and/or method in the carbon capture field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
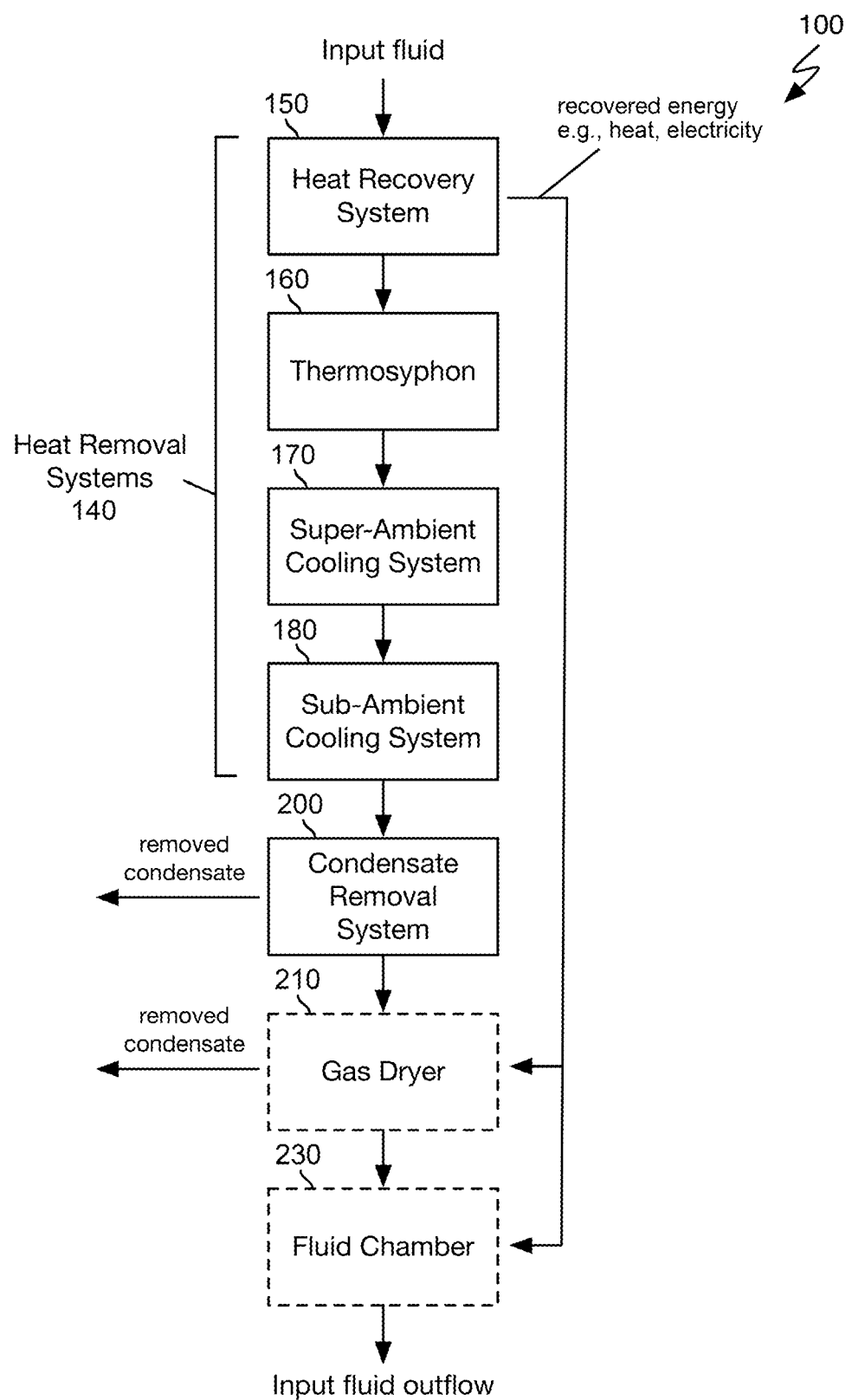
FIG. 1 is a schematic representation of a variant of the system.

With reference to FIG. 1, the conditioning system 100 can include: a set of heat removal systems 140 and a condensate removal system 200. The set of heat removal systems 140 (a.k.a., cooling systems) can include: a heat recovery system 150, a thermosyphon 160, a super-ambient cooling system 170, a sub-ambient cooling system 180, and/or any other suitable set of heat removal systems/stages. The conditioning system 100 can optionally include a gas dryer 210 and a fluid chamber 230. However, the conditioning system 100 can additionally or alternatively include any other suitable set of components. The conditioning system 100 functions to condition an input fluid (e.g., equivalently referenced herein as "source fluid") to facilitate harvesting of a set of target species from the input fluid. In a specific example, the conditioning system 100 can function to pre-treat a vehicle engine exhaust (e.g., removing moisture from the vehicle engine exhaust) to facilitate capture and storage of carbon compounds (e.g., $CO_2$; etc.) from the engine exhaust.

Figure 4:
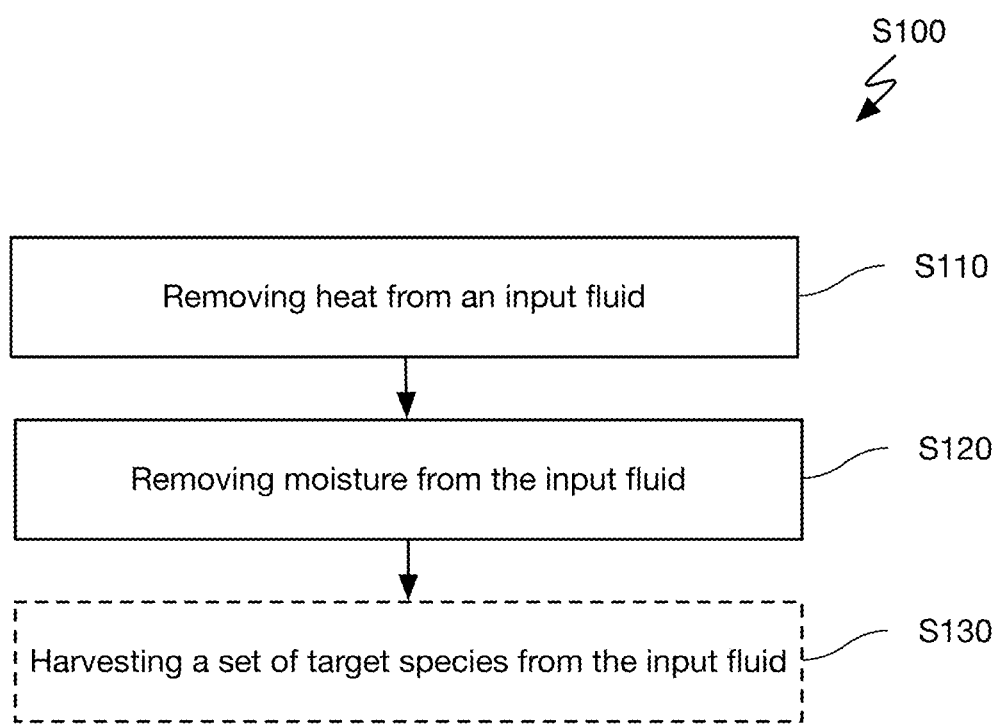
FIG. 4 is a flowchart diagrammatic representation of a variant of the method.

With reference to FIG. 4, a method S100 of conditioning an input fluid (e.g., exhaust gas) can include: removing heat from an input fluid S110; removing moisture from the input fluid S120; and can optionally include harvesting a set of target species from the input fluid S130. However, the method S100 can include any other suitable elements. The method S100 functions to facilitate conditioning of an input fluid flow and/or harvesting of a set of target species from an input fluid flow.

Figure 5:
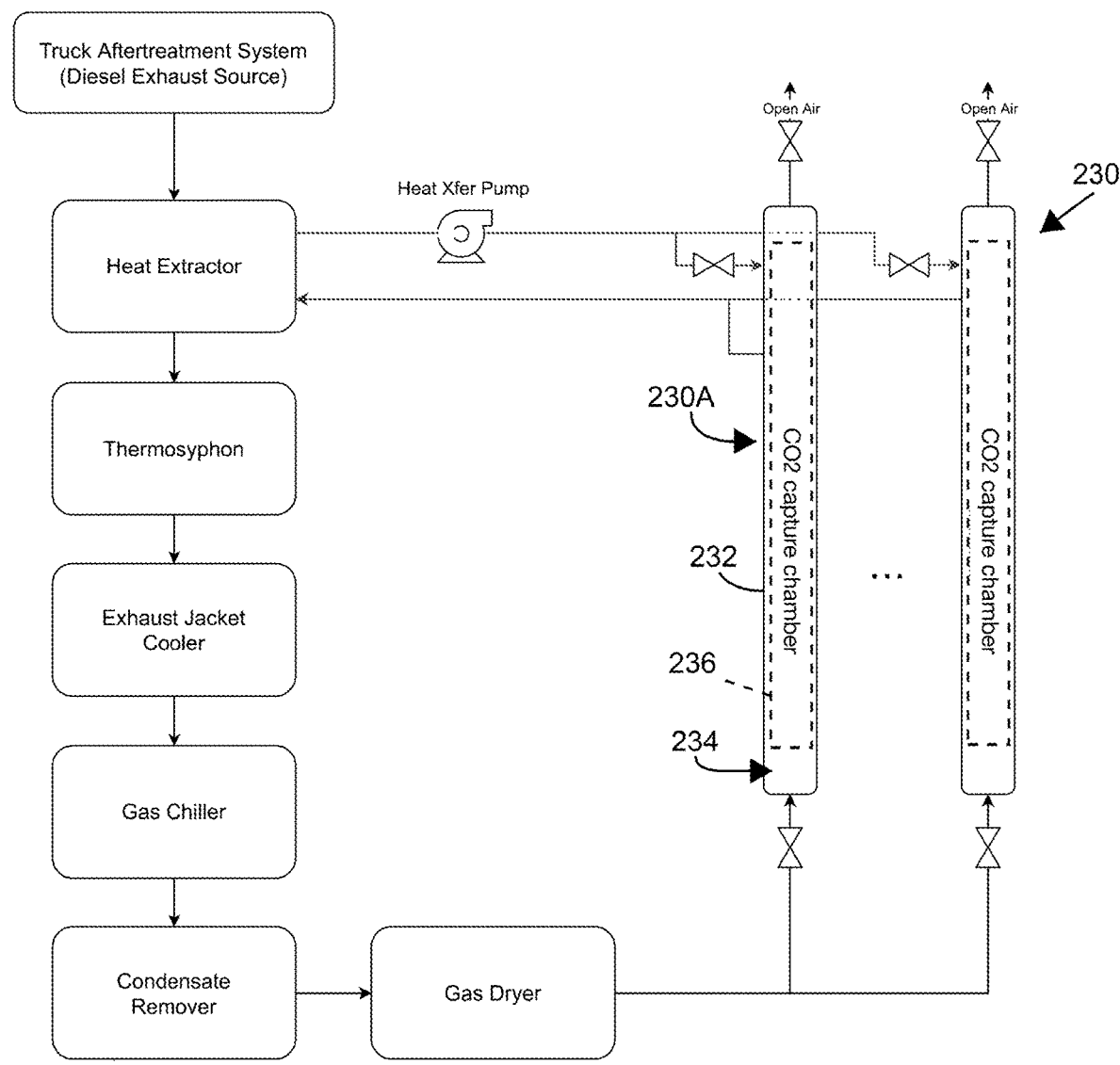
FIG. 5 is a schematic example of a variant of the system.

In variants, as shown in FIG. 5, the conditioning system can be used in conjunction with a method for carbon capture (e.g., mobile carbon capture as provided by way of example in FIG. 5) which can include: adsorbing a set of target species (and/or configuring the fluid chamber system to operate in an adsorption mode) and desorbing the set of target species (and/or configuring the fluid chamber system to operate in a desorption/regeneration mode). In an example, the conditioning system can be used in conjunction with the system and/or method for carbon capture described in U.S. application Ser. No. 17/683,832, filed 1 Mar. 2022 and titled "SYSTEM AND METHOD FOR MOBILE CARBON CAPTURE", which is incorporated herein in its entirety by this reference. However, the fluid chamber system can additionally or alternatively be utilized in conjunction with any other suitable species capture, and/or in conjunction with any other suitable method processes.

In variants, the conditioning system can include or be used with (e.g., mounted to) a mobile vehicle platform such as a Class 8 tractor (or semi-truck) or combination tractor-trailer. The conditioning system can be configured to connect to the vehicle exhaust pipe(s) (e.g., via a fluid manifold, flexible tubing, etc.) and/or to the tractor frame (e.g., between the rear of the cab and the fifth wheel), but can be otherwise suitably configured. However, the conditioning system can alternatively be utilized in any other suitable mobile and/or stationary applications (e.g., such as for a stationary combustion generator, marine vehicles, trains, etc.), and/or can be otherwise used.

The term "substantially" as utilized herein can mean: exactly, approximately, within a predetermined threshold or tolerance, and/or have any other suitable meaning.

2. Benefits

Variations of the technology can afford several benefits and/or advantages.

First, variations of this technology can facilitate carbon capture in a mobile setting, such as onboard a moving vehicle.

Second, variations of this technology can dehumidify an input fluid to facilitate capture of a set of target species using a solid porous capture media, which may be sensitive to performance reduction when exposed to moisture or condensates. A solid porous capture media may advantageously allow capture of the target species under low-pressure adsorption conditions (e.g., at ambient pressure or substantially ambient pressure, such as approximately 1 atmosphere). In an illustrative example, solid porous capture media may preferentially adsorb water over the target species under humid conditions, which may block pores and/or inhibit capture of the target species. The conditioning system may advantageously dehumidify the input fluid to reduce degradation of the capture media and/or improve capture efficiency. Additionally, the dehumidification and/or capture of the target species can occur with low-pressure conditions to reduce backpressure (e.g., minimize/eliminate backpressure and/or backflow) in the input fluid flow. For example, the system can dehumidify engine exhaust and harvest CO2 from the engine exhaust without exhaust backpressure and/or backflow to the engine (e.g., wherein exhaust backpressure and/or backflow may inhibit engine operation and/or reduce engine efficiency).

Third, variations of this technology can facilitate waste heat recovery from vehicle exhaust, such as to improve the energy efficiency of carbon capture from the vehicle exhaust and/or to facilitate dehumidification of the vehicle exhaust prior to carbon capture.

Fourth, variations of this technology can reduce the volume, mass, and/or energy requirements of dehumidification and/or carbon capture, which can, in some examples, allow the conditioning system to be deployed onboard a vehicle in a mobile carbon capture setting.

Fifth, variations of this technology can provide for one or more thermoelectric apparatuses to implement a thermoelectric effect (i.e., a Seebeck Effect and/or a Peltier Effect) so that energy (e.g., electric energy and/or thermal energy) can be captured or recovered at one point along the flowpath of the vehicle exhaust and subsequently utilized, such as at another point along the flowpath. Implementation of the thermoelectric effect can eliminate or reduce the need for less environmentally-friendly options for meeting thermal and/or power needs.

However, variations of the technology can additionally or alternately provide any other suitable benefits and/or advantages.

3. Method

The method S100, an example of which is shown in FIG. 4, can include: removing heat from an input fluid S110; removing moisture from the input fluid S120; optionally include harvesting a set of target species from the input fluid S130; and/or any other suitable elements. The method functions to facilitate conditioning of an input fluid flow and/or harvesting of a set of target species from an input fluid flow.

Removing heat from the input fluid S110 functions to cool the input fluid to facilitate condensate nucleation/removal and/or dehumidification of the input fluid. Additionally or alternatively, S110 can function to facilitate moisture removal in S120. Additionally or alternatively, S110 can recover heat and/or thermal energy from the input fluid flow to be used for subsequent heating (e.g., in S120 and/or S130).

Heat is preferably removed during S110 by the heat removal systems. Accordingly, removing heat from the input fluid flow in S110 can include: extracting heat with the heat recovery system (thereby cooling the input fluid); cooling the input fluid with the thermosyphon; cooling the input fluid with the super-ambient cooling system; and/or cooling/chilling the input fluid with a sub-ambient cooling system. Heat is preferably removed by the heat removal systems in series along a flow path of the input fluid, prior to removing moisture/condensates in S120; however, heat can additionally or alternatively be otherwise suitably removed from the input fluid. For instance, in some variants, one or more heat removal systems can be arranged in parallel with one another or the system can include different cooling paths arranged in parallel with one another. The cooled input fluid from S110 is provided to the condensate removal system (e.g., at an output of sub-ambient cooling system, along the flow path of the input fluid). However, heat can be otherwise suitably removed.

Figure 6:
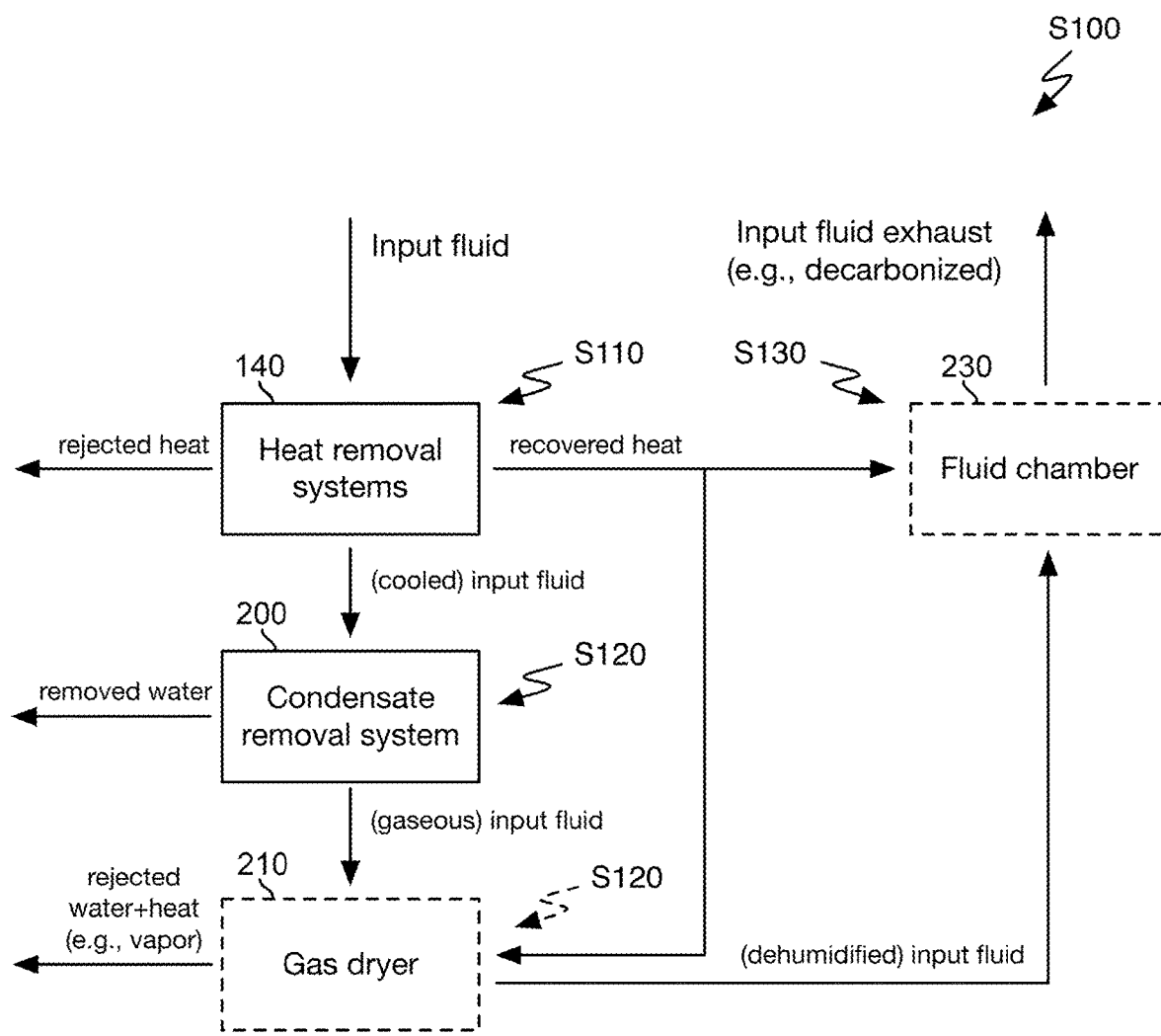
FIG. 6 is an example flowchart diagram of a variant of method.

Removing moisture from the input fluid S120 functions to nucleate, separate, and/or remove condensates from the input fluid. Additionally or alternatively, S120 functions to dehumidify the input fluid prior to S130. Condensates are preferably removed with the condensate removal system using an inertial/centrifugal condensate separator and/or mesh pad, but can additionally or alternatively be removed using a gas dryer, which can be heated with recovered heat (e.g., from the heat recovery system; harvested from the input fluid in S110; an example is shown in FIG. 6). As an example, a gas dryer can be used to remove further moisture (e.g., water vapor) from the gaseous-state input fluid after liquid condensates have been separated and removed.

Condensates are preferably removed during S120 from the cooled/chilled input fluid flow, downstream of the heat removal systems along the input fluid flow path (e.g., an example is shown in FIG. 6). Under a continuous input fluid flow, S110 and S120 can occur contemporaneously, synchronously, and/or simultaneously along different portions of the input fluid flow path; however, S120 can additionally or alternatively occur after S110 (e.g., a discretized or pre-defined volumetric packet of the input fluid is cooled prior to and/or upstream from condensate removal in S120), asynchronously with S110, and/or with any other suitable relationship or timing.

In a first set of variants, the combination of S110 and S120 can include removing condensates using a refrigerant drying process.

In a second set of variants, S120 can include drying the input fluid with a heated desiccant gas dryer which operates using heat recovered from the input fluid.

In a third set of variants, condensates are removed via a combination of some or all of the approaches described above regarding the first and second sets of variants.

However, moisture can be otherwise suitably removed during S120.

S100 can optionally include or be used in conjunction with a process for harvesting a set of target species from the input fluid S130, which can function to harvest a set of target species (e.g., CO2; CO2 and NOx; etc.) from the input fluid (e.g., after moisture removal/dehumidification in S120). In one set of variants, S130 can include any or all of the processes described in U.S. application Ser. No. 17/683,832, filed 1 Mar. 2022 and titled "SYSTEM AND METHOD FOR MOBILE CARBON CAPTURE", which is incorporated herein in its entirety by this reference. However, the target species can be otherwise harvested, and/or the input fluid can be conditioned independently of and/or without harvesting the target species S130.

However, S100 can include any other suitable elements.

4. System

The conditioning system 100, an example of which is shown in FIG. 1, can include: a set of heat removal systems 140 and a condensate removal system 200. The set of heat removal systems 140 can include: a heat recovery system 150, a thermosyphon 160, a super-ambient cooling system 170, a sub-ambient cooling system 180, and/or any other suitable set of heat removal systems/stages. The conditioning system 100 can optionally include a gas dryer 210 and a fluid chamber 230. However, the conditioning system 100 can additionally or alternatively include any other suitable set of components.

The conditioning system 100 functions to condition an input fluid flow to facilitate harvesting of a set of target species from the input fluid. The input fluid flow is preferably continuous (e.g., over a duration, such as during a vehicle drive cycle) and unidirectional (e.g., without backflow), but can additionally or alternatively be uniform, non-uniform, discontinuous, and/or there can be any other suitable input fluid and/or input fluid flow state. In variants, the input fluid can be vehicle engine exhaust gas and the conditioning system 100 can function to condition the vehicle engine exhaust (e.g., removing moisture from the vehicle engine exhaust) to facilitate capture and storage of carbon compounds (e.g., $CO_2$).

In one example, the conditioning system 100 can reduce the relative humidity (e.g., evaluated at −40 degrees Celsius) of the input fluid to substantially 0.00% (e.g., less than 0.005%, less than 0.001%, etc.) and/or a dew point below a threshold temperature (e.g., below: −95 degrees Celsius, −100 degrees Celsius, −110 degrees Celsius, −120 degrees Celsius, etc.) at an inlet of the fluid chamber and/or prior to S130 (e.g., prior to use of the input fluid in S130).

Additionally or alternatively, prior to harvesting a set of target species from the input fluid, the conditioning system 100 can remove between 5 and 120 kW of heat from the input fluid flow under a continuous, unidirectional flow condition (e.g., across the set of heat removal systems). In some variants, prior to harvesting a set of target species from the input fluid, the conditioning system 100 can remove between 40 and 120 kW of heat from the input fluid flow under a continuous, unidirectional flow condition.

4.1 Fluid Chamber

The conditioning system 100 can optionally include or be used in conjunction with one or more fluid chambers 230, which can function to direct the input fluid flow (e.g., vehicle exhaust) through a capture medium and/or harvest one or more target species (e.g., carbon dioxide) from the input fluid.

Each fluid chamber can include a housing, which functions to house and/or contain gasses (e.g., input gas, regeneration gas, etc.) and/or other fluids within the system (e.g., in fluidic contact with the capture medium). The chamber housing preferably defines an interior, in which other elements of the capture module (e.g., the capture medium, internal support structure, etc.) are preferably contained. The chamber housing is preferably configured to act as a pressure vessel, such as a vessel which can maintain a positive and/or negative internal pressure (e.g., relative to an ambient/exterior pressure). The chamber housing preferably includes an outer wall which encloses the interior (e.g., the interior extending between the inlet and outlet ports and/or other fluid ports, etc.). The outer wall is preferably (substantially) fluidly impermeable, and can be rigid, semi-rigid, deformable (e.g., elastically deformable within a range of operating pressures), and/or can have any other suitable properties. However, the fluid chamber can be otherwise formed.

Each fluid chamber preferably includes a capture medium within an interior of its housing, which functions to selectively adsorb one or more target species (e.g., carbon dioxide, water, etc.). The capture medium is preferably a solid material, such as a zeolite material, a metal-organic framework (MOF), activated carbon, desiccant, and/or any other suitable material. The capture medium is preferably substantially porous (e.g., pore sizes of 1-3, 3-10, and/or 10-30 angstroms, etc.), but can additionally or alternatively have any other suitable structure. The capture medium can additionally or alternatively include liquid media and/or any other suitable media. In some examples, the capture medium can include amines (e.g., added to a liquid medium or porous solid medium), which can function to increase storage capacity of the medium. In variants, the capture medium can include a bed (a.k.a. pelletized bed) formed by a plurality of aggregated beads, pellets, and/or other element geometries (e.g., spherical, ellipsoidal, cuboidal, etc.) of a solid adsorbent. The bed can be homogeneous (e.g., substantially similar materials and/or pellet geometries) or heterogeneous (e.g., elements can have mixed sizes, shapes, materials, etc.). However, the system can include any other suitable capture media.

By way of example, FIG. 5 depicts a plurality of fluid chambers 230, including a first fluid chamber 230A. As shown, the first fluid chamber 230A includes a housing 232, which functions to house and/or contain gasses (e.g., input gas, regeneration gas, etc.) and/or other fluids within the system (e.g., in fluidic contact with the capture medium). The chamber housing 232 preferably defines an interior 234, in which a capture medium 236 is contained. The capture medium 236 functions to selectively adsorb one or more target species (e.g., carbon dioxide, water, etc.) from the input fluid. It will be appreciated that the other fluid chambers can be similarly configured.

In variants, at least one of the fluid chambers can include or be thermally coupled to a heat exchanger that functions to heat the housing and/or the capture medium therein (e.g., to facilitate desorption and/or capture of the one or more target species; during one or more modes of operation; etc.) using heat removed/recovered from the input fluid. Additionally or alternatively, the heat exchanger can function to maintain the capture medium within a target temperature range. The heat exchanger can be arranged within the interior of the chamber housing and function to supply heat to (and/or remove heat from) the interior of the chamber and/or capture medium. In a first example, the heat exchanger can be a set of tubes extending through the interior of the chamber housing, wherein an interior of the heated tubes is fluidly coupled to a working fluid (e.g., oil, engine oil, etc.) of the heat recovery system. In a second example, the heat recovery system is configured to transfer heat from the input fluid to the heat exchanger of the fluid chamber via the heat recovery system (e.g., oil loop).

In one set of variants, the fluid chamber can be the chamber as described in U.S. application Ser. No. 17/683,832, filed 1 Mar. 2022 and titled "SYSTEM AND METHOD FOR MOBILE CARBON CAPTURE", which is incorporated herein in its entirety by this reference.

However, the conditioning system can include or be used in conjunction with any other suitable fluid chamber(s). Alternatively, the fluid chamber can be omitted entirely and/or the system/method can be used without a fluid chamber(s).

4.2 Conditioning System

The set of heat removal systems 140 functions to remove heat from the input fluid flow to facilitate condensate removal and/or dehumidification of the input fluid (e.g., prior to S130 of the method S100). Additionally or alternatively, the set of heat removal systems 140 can function to execute S110 of the method S100.

Figure 2:
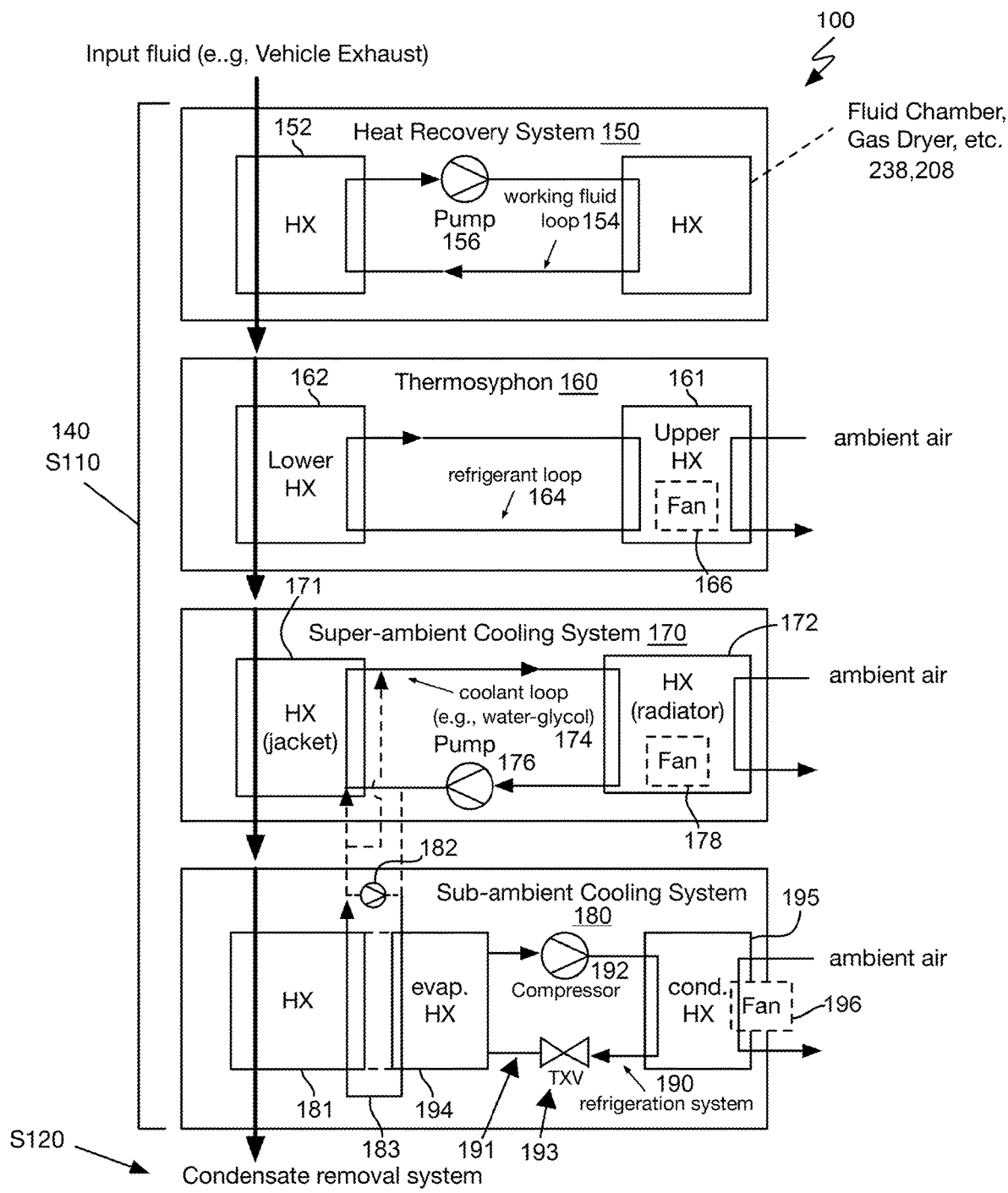
FIG. 2 is a partial schematic representation of a variant of the system.

The set of heat removal systems preferably define a set of cooling stages along a flow path of the input fluid. The cooling stages are preferably serial (e.g., arranged in series along the flow path of the input fluid); however, cooling stages can additionally or alternatively be bypassed, omitted, or re-ordered in some configurations (e.g., to provide continuous operation, in a failure state of one or more heat removal systems, etc.), and/or can have any other suitable arrangement. With reference to FIGS. 1 and 2, the set of heat removal systems 140 can include: a heat recovery system 150, a thermosyphon 160, a super-ambient cooling system 170, a sub-ambient cooling system 180, and/or any other suitable set of heat removal systems/stages.

As shown in FIG. 2, the set of heat removal systems 140 can include a heat recovery system 150, which functions to remove heat from the input fluid and/or transfer heat from the input fluid to the fluid chamber 230 (e.g., a set of tubes therein). The heat recovery system 150 (equivalently referenced herein as "heat extractor") preferably includes a heat exchanger (HX) 152, a working fluid loop 154 (e.g., oil loop; recovery loop; etc.) containing a working fluid, a pump 156, and/or any other suitable elements.

At the heat exchanger 152 (e.g., between an inlet port and an outlet port) of the heat recovery system 150, heat is preferably transferred from the source fluid (flow) to the working fluid (e.g., removing heat from the input fluid; to be transferred to other endpoints of the system, such as the fluid chamber 230 and/or gas dryer 210 as shown in FIG. 1, etc.).

The working fluid of the heat recovery system is preferably a high temperature heat transfer fluid, such as engine oil or Therminol® XP Heat Transfer Fluid, but can additionally or alternatively be any suitable heat transfer fluid, mineral oil, liquid-state working fluid, and/or any other suitable working fluid. The heat recovery system 150 preferably includes a pump 156 configured to circulate the working fluid through the working fluid loop 154, thereby facilitating convective heat transfer at the heat exchanger(s) 152.

The heat recovery system 150 preferably includes a first heat exchanger, or heat exchanger 152, which thermally couples the input fluid to the working fluid of the heat recovery system 150 and is configured to transfer heat from the input fluid to the working fluid. The heat exchanger 152 is preferably a counterflow gas-liquid heat exchanger, but can additionally or alternatively be a gas-liquid heat exchanger, fluid-fluid heat exchanger, a parallel flow heat exchanger, a cross-flow heat exchanger, a double tube heat exchanger, a shell and tube heat exchanger, a plate heat exchanger, a tube-in-tube heat exchanger (concentric tube heat exchanger), and/or any other suitable tube of heat exchanger.

Figure 3:
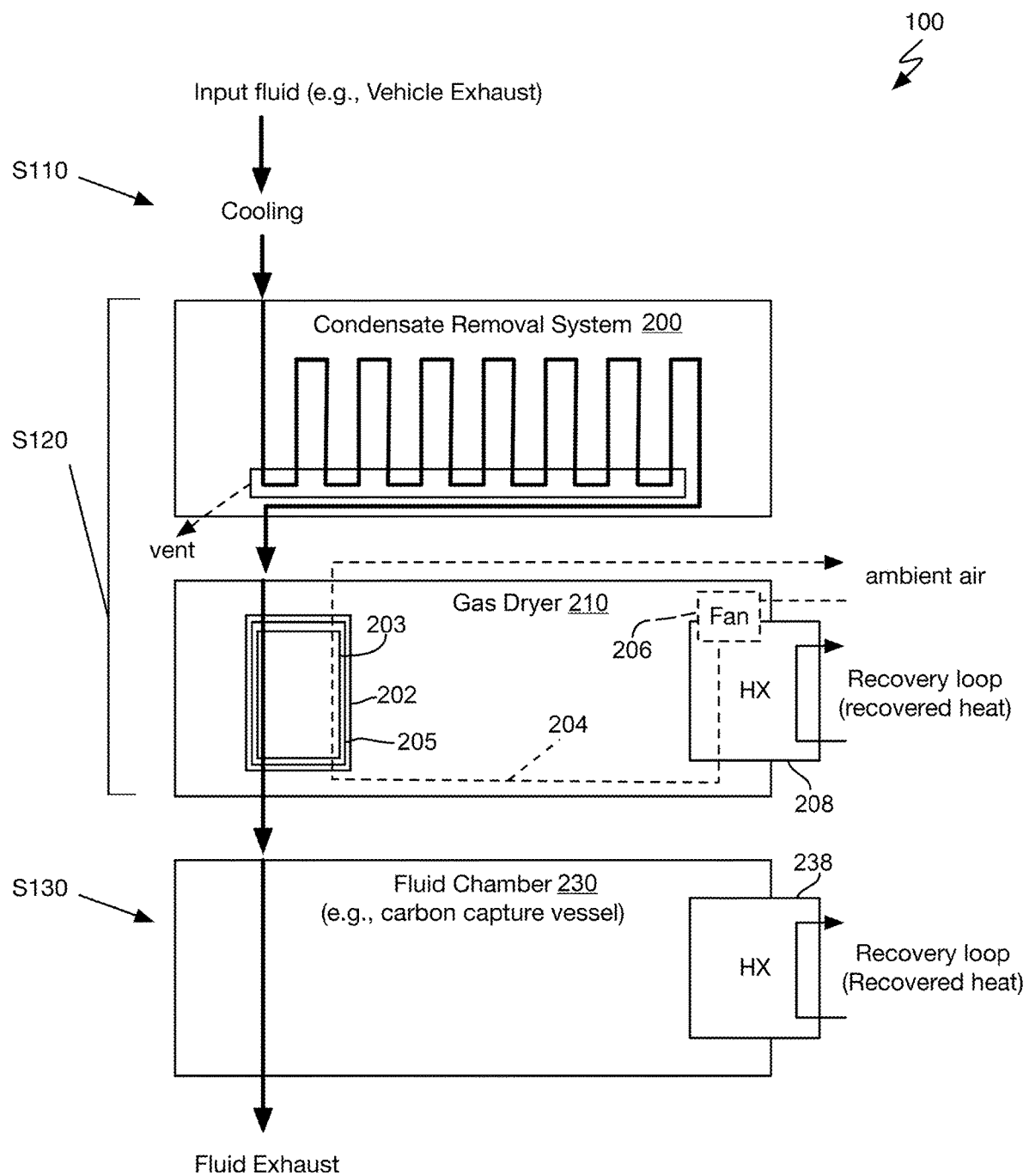
FIG. 3 is a partial schematic representation of a variant of the system.

The working fluid loop 154 preferably extends through and/or thermally connects to a heat exchanger 238 of the fluid chamber 230 and/or a heat exchanger 208 of the gas dryer 210, which can facilitate chamber heating and/or dehumidification using recovered heat from the input fluid flow (e.g., a first example is shown in FIG. 3, a second example is shown in FIG. 5, and a third example is shown in FIG. 6). Additionally or alternatively, the heat recovery system 150 can optionally include, connect to, or be used with a heat exchanger 208 of the gas dryer 210 and/or a heat exchanger 238 of the fluid chamber 230. Elements of the working fluid loop 154 can be fluidly and/or thermally connected by the working fluid in any suitable series arrangement, parallel arrangement, and/or any suitable combination/permutation thereof.

However, the heat removal system 140 can include any other suitable heat recovery system(s).

The heat removal system 140 can include a thermosyphon 160, which can function to remove heat from the source fluid and reject the heat to the ambient surroundings. The thermosyphon 160 is preferably fluidly connected to the heat recovery system 150 (e.g., in series) and receives the reduced-temperature source fluid from the heat recovery system 150 (e.g., at an outlet of a heat exchanger 152 of the heat recovery system 150, e.g., as shown in FIG. 2). However, the thermosyphon 160 can be otherwise suitably integrated as a part of the heat removal system 140.

The thermosyphon 160 includes a thermosyphon working fluid (e.g., refrigerant; R134a; R1234yf), which is fluidly connected to a first (upper) heat exchanger 161 (e.g., evaporator) and a second (lower) heat exchanger 162 (e.g., condenser) and passively circulated between the first and second heat exchangers 161, 162 (e.g., by natural convection, with a gravity driven flow) along a refrigerant loop 164. The first heat exchanger 161 can fluidly and/or thermally couple the ambient air to the thermosyphon working fluid. The second heat exchanger 162 can fluidly and/or thermally couple the source fluid to the thermosyphon working fluid.

In an example, a counterflow gas-liquid heat exchanger cools the source fluid in one direction, and partially evaporates refrigerant in the other direction. The resulting 2-phase refrigerant rises to another heat exchanger positioned above the counterflow gas-liquid heat exchanger, and is condensed by cool ambient air. The condensed refrigerant then falls down and forms a gravity-driven flow of energy from the source fluid to ambient air.

The thermosyphon 160 can optionally include or be used with a fan 166 to circulate the ambient air at the first heat exchanger 161 to improve condensing performance and/or heat exchange (e.g., by force convection) at the first heat exchanger 161. As an example, the thermosyphon fan 166 can be powered by vehicle power (e.g., 12 VDC vehicle battery) with a parasitic load of about 0.5 kW and can reject about 20 kW of heat to the ambient air (e.g., where the remainder of the thermosyphon is passive/unpowered; which can yield a coefficient of performance of about 20 to 50).

However, the heat removal system 140 can include any other suitable thermosyphon.

The heat removal system 140 can include a super-ambient cooling system 170, which functions to remove heat from the source fluid and reject the heat to the ambient surroundings. The super-ambient cooling system 170 is preferably fluidly connected to the thermosyphon 160 (e.g., in series) and receives the reduced-temperature source fluid from the thermosyphon 160 (e.g., from an outlet of the lower heat exchanger 162). In an example, the source fluid received from the thermosyphon 160 can be about 50 C.

The super-ambient cooling system 170 preferably includes a coolant loop 174 containing a working fluid (e.g., water-glycol mixture, water, etc.), a pump 176 configured to circulate the working fluid through the coolant loop 174, a first heat exchanger 171 thermally coupling the source fluid to the working fluid, and a second heat exchanger 172 (e.g., radiator) thermally coupling the working fluid to the ambient air.

The first heat exchanger 171 is preferably a concentric-tube, counterflow heat exchanger, such as an annular cooling 'jacket' surrounding the source fluid which transfers heat from the exhaust tubing to the ambient air. The exhaust jacket and/or coolant loop 174 is preferably substantially thermally uninsulated, but can alternatively be partially insulated (e.g., chilled portion can be insulated when implemented in conjunction with a sub-ambient cooling system 180) and/or can be otherwise configured.

In variants, the second heat exchanger 172 can be used with a fan 178 to provide forced convection and/or circulate ambient air through the second heat exchanger 172 (e.g., ducted, non-ducted, shrouded, unshrouded, etc.). In an example, the second heat exchanger 172 can be an automotive radiator.

In variants, the super-ambient cooling system 170 can be an automotive cooling system (e.g., resembling an engine coolant loop) and configured to cool the source gas to near-ambient (e.g., within a few degrees C. of ambient air temperature).

However, the conditioning system 100 can include any other suitable super-ambient cooling system. The super-ambient cooling system 170 can be likewise referenced as an "ambient cooling system" and/or a "near-ambient cooling system."

The heat removal system 140 can include a sub-ambient cooling system 180, which functions to remove heat from the source fluid and reject the heat to the ambient surroundings. Additionally or alternatively, the sub-ambient cooling system 180 functions to chill the input fluid (e.g., below ambient temperature). The sub-ambient cooling system 180 is preferably fluidly connected to the super-ambient cooling system 170 (e.g., in series) and receives the reduced-temperature source fluid from the super-ambient cooling system 170 (e.g., from the jacket outlet).

The sub-ambient cooling system 180 receives the source fluid at a first heat exchanger 181, which is chilled by a refrigeration system 190. In a first variant, the refrigeration system 190 is configured to pump heat directly between the first heat exchanger 181 (e.g., configured as an evaporative HX) and a second heat exchanger 195 (condensing HX), which is fluidly coupled to ambient. In a second variant, the refrigeration system 190 chills a working fluid (e.g., water, glycol; the working fluid of the coolant loop 174 of the super-ambient cooling system 170), which is circulated through the first heat exchanger 181 with a pump 182 and/or pump 176.

In a first example, the sub-ambient cooling system 180 includes a coolant loop 183, which is fluidly decoupled from the super-ambient cooling system 170 (e.g., from the coolant loop 174 of the super-ambient cooling system 170). In the first example, a working fluid can be circulated around the coolant loop 183 by the pump 182 completely within the sub-ambient cooling system 180, wherein the refrigeration system 190 chills the working fluid flowing along the coolant loop 183. In a second example, the working fluid is shared between the sub-ambient and super-ambient cooling systems 180, 170 (e.g., an example is shown in FIG. 2). That is, in the second example, the coolant loop 183 of the sub-ambient cooling system 180 is fluidly coupled with the coolant loop 174 of the super-ambient cooling system 170 (e.g., at or adjacent the inlet of the first heat exchanger 171 and/or at or adjacent the outlet of the first heat exchanger 171 as shown in FIG. 2). In the second example, the pump 182 can be eliminated, for example. In a third example, the sub-ambient and super-ambient cooling systems 180, 170 include separate pumps. In a fourth example, the first heat exchanger 171 of the super-ambient cooling system 170 is in parallel with the heat exchanger 181 of the sub-ambient cooling system 180. In a fifth example, the heat exchangers 181, 171 of the sub-ambient and super-ambient cooling systems 180, 170 are arranged in series. In a sixth example, the sub-ambient cooling system 180 includes a mini-split refrigeration system. In a seventh example, the sub-ambient cooling system 180 includes a combination of two or more aspects described above with respect to the first through sixth examples.

The refrigeration system 190 of the sub-ambient cooling system 180 can include: a refrigerant loop 191 containing a refrigerant, a compressor 192, which compresses the refrigerant and circulates the refrigerant through the refrigeration system 190, a thermal expansion valve (TXV) 193, an evaporator 194, a condenser 195, and/or any other suitable components. The refrigeration system 190 can optionally include a fan 196, which circulates ambient air across the condenser 195 to increase convective heat transfer. The compressor 192 and/or the fan 196 can be powered by a vehicle battery (e.g., 12 VDC), an auxiliary power source (e.g., 48V battery, etc.), and/or can be otherwise suitably powered.

However, the heat removal system 140 can include any other suitable sub-ambient cooling system.

The condensate removal system 200 preferably functions to separate and/or remove condensates from the (cooled) input fluid. Additionally or alternatively, the condensate removal system 200 functions to dehumidify the input fluid. The condensate removal system 200 preferably nucleates condensates using an inertial/centrifugal condensate separator. In a first example, the condensate removal system 200 includes an array of vanes (e.g., boustrophedonic, serpentine, convoluted, and/or interdigitated vanes, etc.), which can function to accelerate input fluid rotationally (and/or linearly), and a wire mesh pad, which can function to nucleate water droplets. The droplets can be funneled towards an accumulator and/or vented via a controlled release mechanism (e.g., vent, manual release, solenoid release, orifice, etc.). Additionally or alternatively, the condensate removal system 200 can include any suitable condensate separator and/or removal mechanisms.

Figure 7:
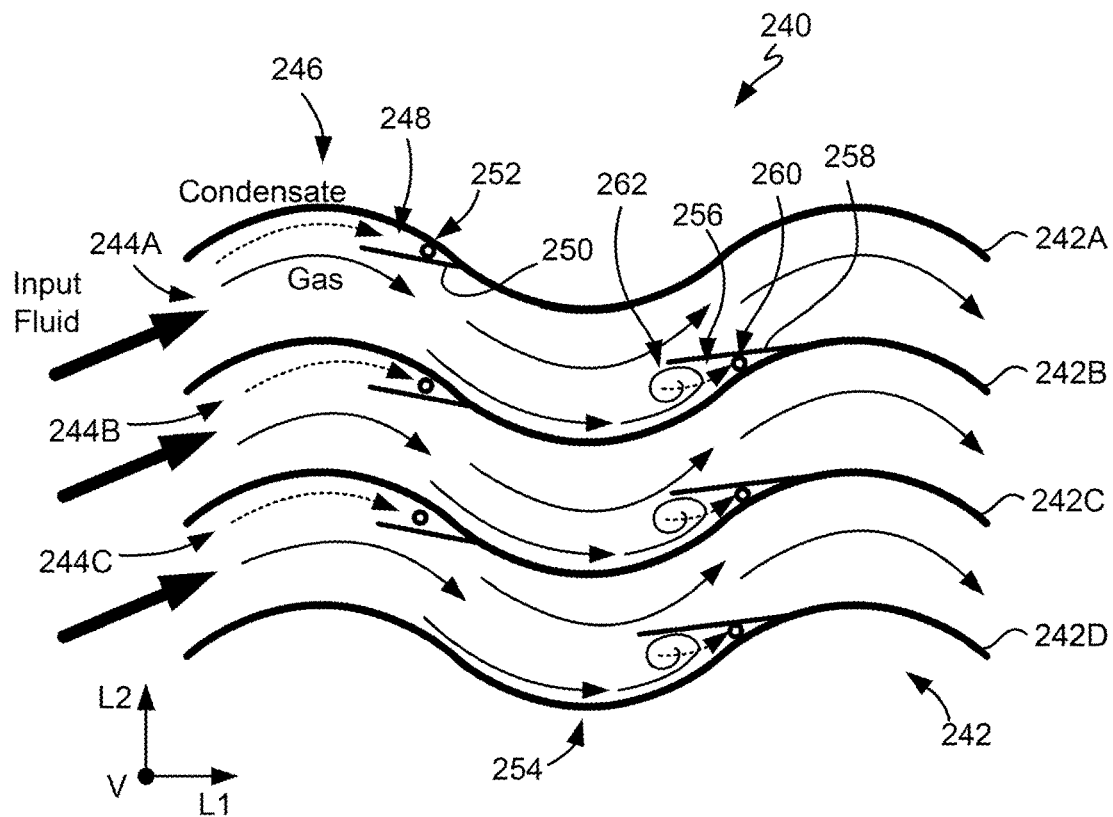
FIG. 7 is a schematic, top plan view of an inertial condensate separator according to one example variant.

By way of example, FIG. 7 provides a schematic, top plan view of an inertial condensate separator 240 according to one example variant. For reference, the inertial condensate separator 240 defines a longitudinal direction L1, a lateral direction L2, and a vertical direction V so as to define an orthogonal direction system. In FIG. 7, the vertical direction V extends into and out of the page.

The inertial condensate separator 240 is operable to remove moisture from the input fluid (e.g., exhaust gas) utilizing the inertia of the input fluid flowing therethrough. As depicted in FIG. 7, the inertial condensate separator 240 includes a plurality of vanes 242 that extend lengthwise along the longitudinal direction L1 and are spaced from one another along the lateral direction L2. Each one of the vanes 242 has a sinusoidal arrangement as viewed along the vertical direction V. Although four (4) vanes are shown in FIG. 7, including a first vane 242A, a second vane 242B, a third vane 242C, and a fourth vane 242D, the inertial condensate separator 240 can include less or more than four (4) vanes in other variants.

The vanes 242 are positioned along the flow path of the input fluid and define subpassages thereof. That is, the first vane 242A and the second vane 242B define a first subpassage 244A, the second vane 242B and the third vane 242C define a second subpassage 244B, and the third vane 242C and the fourth vane 242D define a third subpassage 244C. As depicted, input fluid (e.g., cooled input fluid from the heat removal systems 140) can flow through each of the subpassages.

After the input fluid enters the subpassages 244A, 244B, 244C, the input fluid is turned in the respective subpassages at a first bend 246 (e.g., a left-to-right bend). As this occurs, the gaseous phase or portion of the input fluid is able to turn faster than the water vapor/condensate phase or portion of the input fluid. Accordingly, as shown in FIG. 7, in each subpassage, condensate can become caught in an upstream condensate trap defined between a vane and a protrusion that extends from the vane outward into the subpassage. For instance, for the first subpassage 244A, condensate (labeled with a dashed-line) can be become caught in an upstream condensate trap 248 defined by the first vane 242A and a protrusion 250 extending outward from the first vane 242A into the first subpassage 244A. The inertia of the input fluid at the first bend 246 is utilized to catch the condensate whilst allowing a majority of the gaseous portion to continue downstream along the first subpassage 244A. A drain 252 can be in flow communication with the upstream condensate trap 248 to allow condensate to drain from the inertial condensate separator 240, e.g., to an accumulator, offboard the system and/or vehicle, to another system, etc.

After the first bend 246, the input fluid, which includes a gaseous phase or portion and a now-depleted water vapor/condensate phase or portion, is turned in the respective subpassages at a second bend 254 (e.g., a right-to-left bend). As this occurs, the gaseous phase or portion of the input fluid is able to turn faster than the water vapor/condensate phase or portion of the input fluid. Accordingly, as shown in FIG. 7, in each subpassage, condensate can become caught in a downstream condensate trap defined between a vane and a protrusion that extends from the vane outward into the subpassage.

For instance, for the first subpassage 244A, condensate can be become caught in a downstream condensate trap 256 defined by the second vane 242B and a protrusion 258 extending outward from the second vane 242B into the first subpassage 244A. The inertia of the input fluid at the second bend 254 is utilized to catch the condensate whilst allowing a majority of the gaseous portion to continue onward downstream along the first subpassage 244A. A drain 260 can be in flow communication with the downstream condensate trap 256 to allow condensate to drain from the inertial condensate separator 240, e.g., to an accumulator, offboard the system and/or vehicle, to another system, etc.

Notably, the input fluid, or more particularly the gaseous phase of the input fluid, can form eddies or swirl at or just upstream of the downstream condensate traps of the respective subpassages. For example, an eddy 262 is shown forming in or just upstream of the downstream trap 256 in FIG. 7. This advantageously increases the pressure of the input fluid within a subpassage, which forces additional water vapor of the input fluid to condense.

In other variants, the inertial condensate separator 240 can include further subsequent downstream traps in addition to those shown in FIG. 7, e.g., corresponding with subsequent downstream bends.

Moreover, in some variants, for a given subpassage, a subsequent condensate trap extends from a different vane than does a previous condensate trap associated with the given subpassage. For instance, the protrusion 250A extends outward into the first subpassage 244A from the first vane 242A whilst the protrusion 258 associated with the downstream condensate trap 256 extends outward into the first subpassage 244A from the second vane 242B. Stated differently, for left-to-right bends, a protrusion defining a condensate trap extends from the left vane defining a subpassage; and conversely, for right-to-left bends, a protrusion defining a condensate trap extends from the right vane defining the subpassage.

Figure 8:
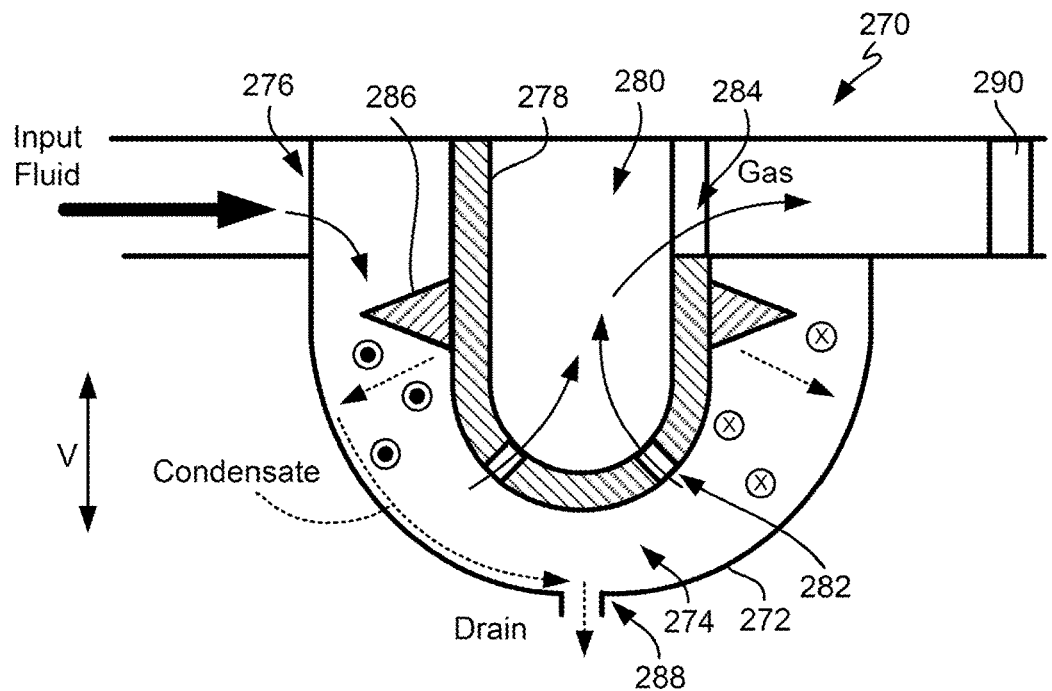
FIG. 8 is a schematic, side cross-sectional view of a centrifugal condensate separator according to one example variant.

FIG. 8 provides a schematic, side cross-sectional view of a centrifugal condensate separator 270 according to one example variant. For reference, the centrifugal condensate separator 270 defines a vertical direction V. The centrifugal condensate separator 270 is operable to remove moisture from the input fluid (e.g., exhaust gas) by directing the input fluid into a separation chamber and using centrifugal forces to separate condensates from the gaseous portion of the input fluid.

As depicted in FIG. 8, the centrifugal condensate separator 270 includes a base housing 272 that defines a separator chamber 274. The separator chamber 274 is fluidly coupled with or positioned along the flow path of the input fluid (e.g., exhaust gas). Accordingly, input fluid can flow into the separator chamber 274, e.g., at an inlet 276. A central housing 278 also defines, in part, the separator chamber 274, and also defines an exit chamber 280 that is fluidly coupled with the separator chamber 274. The central housing 278 can define one or more openings 282 that allow input fluid to flow from the separator chamber 274 into the exit chamber 280. The central housing 278 also defines an outlet 284 of the centrifugal condensate separator 270.

In operation, input fluid enters the centrifugal condensate separator 270 through the inlet 276. The input fluid then begins to swirl around the annulus of the separator chamber 274. For instance, the input fluid can flow out of the page on the left side of FIG. 8, as denoted by the encircled dots, and into the page on the right side of the FIG. 8, as denoted by the encircled X's, or vice versa, or both directions simultaneously. Notably, as the input fluid swirls around the separator chamber 274, the input fluid engages a turbulator 286. The turbulator 286 extends from the central housing 278 outward into the separator chamber 274. The turbulator 286 has a triangular cross section for the depicted embodiment of FIG. 8, but in other variants, the turbulator 286 can have other suitable cross sections. When the input fluid engages the turbulator 286, the turbulator 286 can facilitate and/or maintain turbulent flow in the separator chamber 274. This turbulent flow can help increase the centrifugal force applied on the base housing 272, which effectively separates condensates from the gaseous phase or portion of the input fluid. The separated condensates can flow to a drain 288 defined by the base housing 272. The drain 288 allows condensates to drain from the centrifugal condensate separator 270, e.g., to an accumulator, offboard the system and/or vehicle, to another system, etc.

The gaseous phase or portion of the input fluid separated from the condensate can flow into the exit chamber 280 through the openings 282 and can ultimately exit the centrifugal condensate separator 270 as cooled, moisture-depleted input gas.

In some further variants, a wire mesh pad can be used in addition or alternatively to the inertial condensate separator 240 and/or centrifugal condensate separator 270. For instance, as shown in FIG. 8, a wire mesh pad 290 is positioned along the flow path of the input fluid downstream of the centrifugal condensate separator 270. The input fluid can flow into or across the wire mesh pad 290, causing condensates to separate from the gaseous portion of the input fluid. Wire mesh pads can be positioned upstream and/or downstream of another condensate separator.

The condensate removal system 200 is preferably passive, but can additionally or alternatively include an active release mechanism and/or can be actively controlled.

Further, in some variants, at least two or all of the noted condensate separators can form the condensate removal system 200.

The conditioning system 100 can optionally include a gas dryer 210, which can function to remove moisture from the input fluid and/or to further dehumidify the input fluid. The gas dryer 210 is preferably arranged in series with and following the condensate removal system 200 along a flow path of the input fluid, but can be otherwise suitably arranged.

The gas dryer 210 is preferably a heated desiccant dryer, but can additionally or alternatively be a desiccant dryer that includes a desiccant media (e.g., silicone beads, silica gel, Zeolite, activated carbon, etc.) arranged along a flow path of the input fluid. In one variant, the desiccant is attached to a wheel, which is rotated under a continuous flow of the input fluid and regenerated via a heated airstream of counter-flowing ambient air (which rejects moisture from the desiccant wheel in vapor form). As an example, part of a cross section of the desiccant wheel (e.g., 75%) can be exposed to the source fluid and a remainder (e.g., about 25%) can be exposed to a counter-flowing stream of heated ambient air, which in turn removes moisture from the wheel and is vented to the environment.

As shown in FIG. 3, in one variant, the gas dryer 210 can include a desiccant filter 202 positioned along the flow path of the input fluid. The desiccant filter 202 can include a desiccant media 203 (e.g., silicone beads, silica gel, Zeolite, activated carbon, etc.). The desiccant media 203 can be attached to a wheel 205 of the desiccant filter 202. The wheel 205 can be rotated under a continuous flow of the input fluid. The desiccant media 203 can be regenerated by a counter-flowing airstream 204 heated with heat recovered from at least one of the one or more heat removal systems 140 (e.g., the heat recovery system 150 as shown in FIG. 2).

Recovered heat from the one or more heat removal systems 140 can be directed to the heat exchanger 208 of the gas dryer 210 along a recovery loop (e.g., the working fluid loop 154) as shown in FIGS. 2 and 3. In some variants, a fan 206 can move ambient air through the heat exchanger 208 so that recovered heat is imparted to the ambient air. In other variants, ambient air can passively pass through the heat exchanger 208. The counter-flowing airstream 204, or heated counter-flowing ambient air, can be directed to the desiccant filter 202 in a counter-flow manner to regenerate the desiccant media 203 of the desiccant filter 202. The counter-flowing airstream 204 removes moisture from the wheel 205/desiccant media 203 and can be vented to the environment, collected (e.g., in an accumulator), circulated to other systems (e.g., for cooling), or otherwise removed from the system 100. The cooled, moisture-depleted input fluid can then be selectively distributed (e.g., by control of one or more valves positioned between the gas dryer 210 and the fluid chambers 230; an example of which is shown in FIG. 5) to the fluid chambers 230 to allow for harvesting or capture of a set of target species from the input fluid. The captured target species (e.g., CO2) can then be stored in one or more storage vessels.

In a first example, the gas dryer 210 can be a passive, heated desiccant dryer, which operates using recovered heat within the recovery loop. The gas dryer 210 can also use additional or supplemental heat sources, such as electrical heaters, to facilitate removal of moisture from the input fluid. The electrical heaters can be powered, e.g., by an alternator mounted to the engine.

In a second example the conditioning system 100 can operate as a combined refrigerant dryer and a regenerative desiccant dryer, heated with recovered waste heat.

However, the conditioning system 100 can include any other suitable components.

In some further variants, the conditioning system can include one or heat removal systems, such as one or more of the heat removal systems 140 depicted in FIG. 1 and described herein, and the capture medium of the capture module(s) positioned downstream of the conditioning system can be formed of a material that captures or uptakes the target species (e.g., carbon dioxide) better with water in the gas stream than without. In such variants, the condensate removal system and/or the gas dryer can be omitted or otherwise sized/controlled for a reduced condensate removal workload.

In some variants, the conditioning system provided herein for conditioning an input fluid can include materials/structures/arrangements to implement a thermoelectric effect (i.e., a Seebeck Effect and/or a Peltier Effect). In this way, for example, energy (e.g., electric energy and/or thermal energy) can be captured or recovered at one point along the flowpath of the input fluid and subsequently utilized, such as at another point along the flowpath.

In one example, at least one thermoelectric apparatus can be positioned along the flow path to implement the Seebeck Effect. Particularly, the thermoelectric apparatus can be arranged to utilize the relatively hot exhaust gas flowing along the flow path to create a temperature difference between two dissimilar electric conductors so as to produce a voltage difference therebetween. In this manner, the heat from the exhaust gas can be utilized by the thermoelectric apparatus to produce an electric current or electricity. In some variants, a plurality of thermoelectric apparatuses can be electrically coupled (e.g., in parallel) so as to increase the voltage produced.

The electric energy captured by the thermoelectric apparatus implementing the Seebeck Effect can be directed to one or more electric loads or electric energy consumers, such as at least one thermoelectric apparatus implementing the Peltier Effect. The thermoelectric apparatus implementing the Peltier Effect can be positioned along the flow path of the input fluid, e.g., downstream of the thermoelectric apparatus implementing the Seebeck Effect. The thermoelectric apparatus implementing the Peltier Effect can be arranged so that the electric energy or electric current captured by the thermoelectric apparatus implementing the Seebeck Effect is made to flow through a junction between two conductors, which consequently causes heat to be removed from the input fluid flowing along the flow path. Accordingly, energy, in this instance electric energy, can be captured and used subsequently to cool or remove heat from the input fluid. Such variants can be particularly beneficial from a climate and/or environmental perspective, as energy can be captured and used subsequently for exhaust gas conditioning without or with a reduced need to use certain coolants, such as oil, refrigerants, etc.

Figure 9:
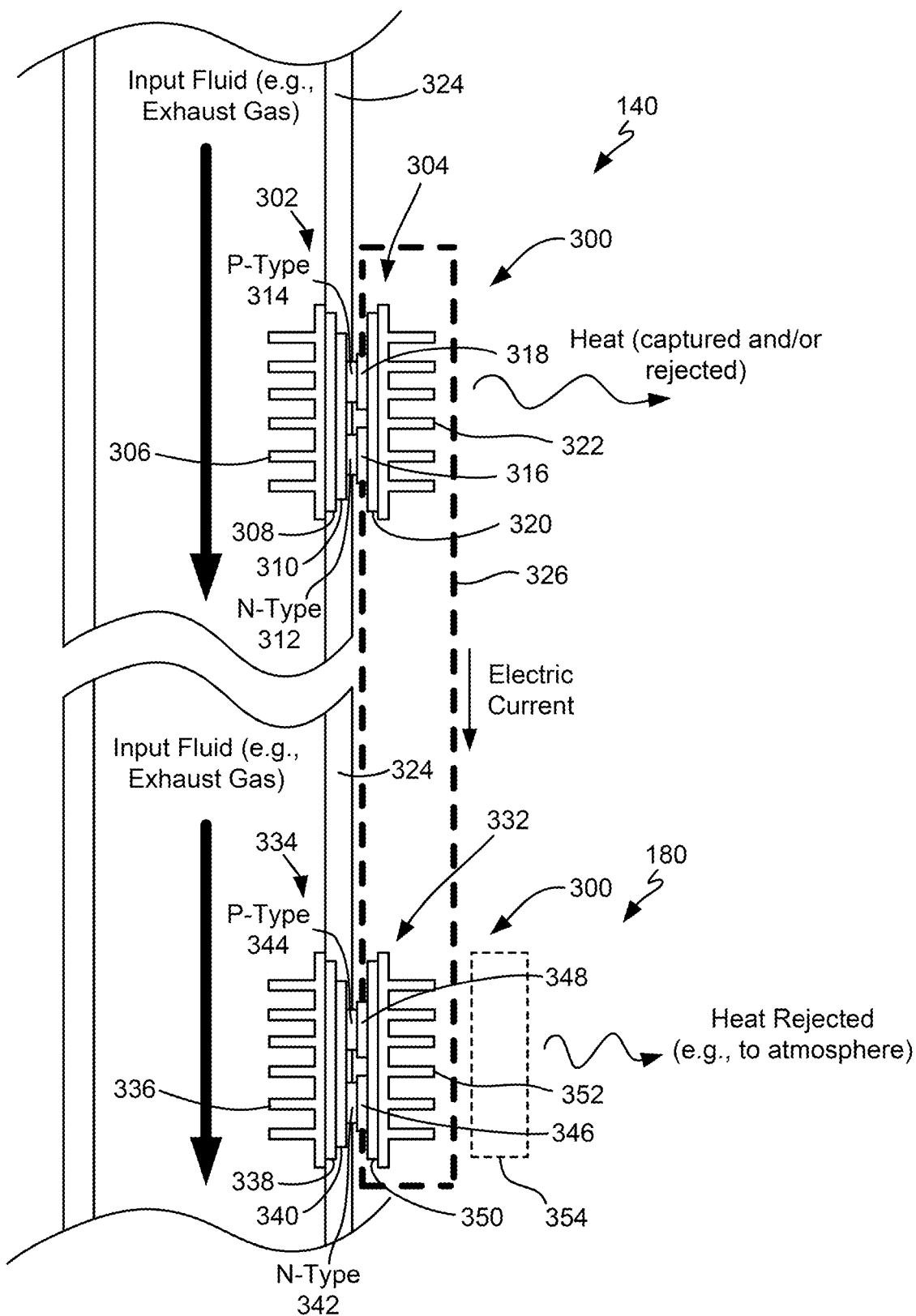
FIG. 9 is a schematic view of one variant of a conditioning system that implements thermoelectric apparatuses.

By way of example, FIG. 9 provides a schematic view of one variant of a conditioning system that utilizes thermoelectric apparatuses. As shown in FIG. 9, the heat removal systems 140 include at least one Seebeck-type or first thermoelectric apparatus 300. The first thermoelectric apparatus 300 is positioned along the flow path of the input fluid and has a hot side 302 and a cold side 304, or a hot junction and a cold junction. The hot side 302 is made relatively hot by the input fluid. The cold side 304 is cold relative to the hot side 302. Generally, from left to right, the first thermoelectric apparatus 300 includes a hot side heat sink or hot side fins 306 that extend into the flow path of the input fluid, a hot side ceramic substrate 308, a hot side electrical conductor 310, N-type and P-type semiconductors 312, 314, first and second cold side electrical conductors 316, 318, a cold side ceramic substrate 320, and a cold side heat sink or cold side fins 322. A pipe along which the input fluid flows can include insulation 324 for providing insulation between the hot side 302 and the cold side 304. Further, in some variants, a fan can optionally be arranged to pass air across the cold side fins 322, e.g., to better keep or maintain the cold side 304 cold.

The first thermoelectric apparatus 300 is associated with an electric circuit 326, which is formed in part by the first cold side electrical conductor 316, the N-type semiconductor 312, the hot side electrical conductor 310, the P-type semiconductor 314, and the second cold side electrical conductor 318. Due to the temperature differential between the hot side 302 and the cold side 304 and the arrangement of the components of the first thermoelectric 300, the first thermoelectric apparatus 300 produces a voltage and consequently drives electric current along the electric circuit 326. It will be appreciated that the first thermoelectric apparatus 300 can be one of a plurality of first thermoelectric apparatuses of the heat removal systems 140 that can be electrically coupled together to drive electric current along the electric circuit 326.

Furthermore, heat rejected at the cold side 304 can be captured and utilized, e.g., at the gas dryer 210 and/or the fluid chambers 230 (FIG. 1).

As further shown in FIG. 9, the sub-ambient cooling system 180 includes at least one Peltier-type or second thermoelectric apparatus 330 that functions to cool or remove heat from the input fluid, e.g., to a sub-ambient temperature, within a predetermined margin of a sub-ambient temperature (e.g., at least within 15%), etc. The second thermoelectric apparatus 330 is positioned along the flow path of the input fluid, e.g., downstream of the first thermoelectric apparatus 300. The second thermoelectric apparatus 330 has a hot side 332 and a cold side 334, or a hot junction and a cold junction. The cold side 334 is cold relative to the hot side 332. Generally, from left to right, the second thermoelectric apparatus 330 includes a cold side heat sink or cold side fins 336 that extend into the flow path of the input fluid, a cold side ceramic substrate 338, a cold side electrical conductor 340, N-type and P-type semiconductors 342, 344, first and second hot side electrical conductors 346, 348, a hot side ceramic substrate 350, and a hot side heat sink or hot side fins 352.

Like the first thermoelectric apparatus 300, the second thermoelectric apparatus 330 is associated with or electrically coupled with the electric circuit 326, which is formed in part by the first hot side electrical conductor 346, the N-type semiconductor 342, the cold side electrical conductor 340, the P-type semiconductor 344, and the second hot side electrical conductor 348. Due to the application of electric current through the second thermoelectric apparatus 330, heat transferred from the input fluid to the cold side fins 336 is ultimately moved to the hot side 332 and rejected, e.g., to atmosphere and/or other systems. In some variants, a fan 354 optionally can be used to facilitate dissipation of the heat from the hot side fins 352. It will be appreciated that the second thermoelectric apparatus 330 can be one of a plurality of second thermoelectric apparatuses of the sub-ambient system 180 that can be electrically coupled with one another and/or the electric circuit 326.

It will be appreciated that FIG. 9 provides but one non-limiting example of implementation of the thermoelectric effect to condition exhaust gas for preparation for carbon capture. In some alternative variants, the voltage produced by one or more Seebeck-type thermoelectric apparatuses can be used to drive electric current to other electric power consuming devices, such as local sensors, fans, electrically-actuated valves, electrical actuators, power consuming elements of the gas dryer 210 (e.g., to an electric motor rotatably driving the wheel 205) and/or fluid chamber 230, etc. in addition or as an alternative to directing the electric current to one or more Peltier-type thermoelectric apparatuses. Further, in other alternative variants, the electric current directed to one or more Peltier-type thermoelectric apparatuses can be provided by a power source or supply other than the one or more Seebeck-type thermoelectric apparatuses. For instance, a battery, solar cell, generator coupled with a vehicle engine, etc. can act as the power source for the electric current directed to the one or more Peltier-type thermoelectric apparatuses.

In some variants, one or more heat removal systems of a conditioning system can include a thermoelectric apparatus positioned along the flow path of the exhaust gas. The thermoelectric apparatus can be arranged to utilize a temperature differential between at least one hot side electrical conductor and at least one cold side electrical conductor so as to drive an electric current along an electric circuit to one or more power consuming devices, i.e., via the Seebeck Effect.

In some variants, one or more heat removal systems of a conditioning system can include a thermoelectric apparatus positioned along the flow path. The thermoelectric apparatus can be arranged to utilize an electric current directed thereto to remove heat from the exhaust gas, i.e., via the Peltier Effect.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A conditioning system for mobile capture, the conditioning system comprising:
   one or more heat removal systems positioned along a flow path of an exhaust gas, the one or more heat removal systems being operable to remove heat from the exhaust gas, the one or more heat removal systems including a sub-ambient cooling system that comprises:
      a refrigeration system having a refrigerant loop containing a refrigerant, an evaporator heat exchanger positioned along the refrigerant loop, and a condenser heat exchanger positioned along the refrigerant loop and thermally coupling the refrigerant and ambient air such that heat is expelled from the refrigerant, and
      a first heat exchanger thermally coupled with the refrigeration system such that heat is transferred from the exhaust gas to the refrigerant;
   a condensate removal system positioned downstream of the one or more heat removal systems along the flow path, the condensate removal system being operable to remove moisture from the exhaust gas; and
   one or more fluid chambers positioned downstream of the condensate removal system along the flow path, each one of the one or more fluid chambers defines an interior in which a capture medium is contained.

2. The conditioning system of claim 1, wherein at least one fluid chamber of the one or more fluid chambers includes or is thermally coupled to a heat exchanger that is thermally coupled with at least one of the one or more heat removal systems such that heat recovered at the at least one of the one or more heat removal systems is imparted to the capture medium of the at least one fluid chamber.

3. The conditioning system of claim 1, wherein the one or more heat removal systems include a heat recovery system, the heat recovery system comprises:
a working fluid loop containing a working fluid; and
a first heat exchanger positioned along the working fluid loop and thermally coupling the exhaust gas and the working fluid such that heat is transferred from the exhaust gas to the working fluid, and
wherein a fluid chamber and/or a gas dryer includes or is thermally coupled with a second heat exchanger positioned along the working fluid loop such that heat is transferred from the working fluid to the fluid chamber and/or the gas dryer.

4. The conditioning system of claim 1, wherein the one or more heat removal systems include a thermosyphon, the thermosyphon comprises:
a refrigerant loop containing a thermosyphon working fluid;
a first heat exchanger positioned along the refrigerant loop and thermally coupling the thermosyphon working fluid and ambient air such that heat is expelled from the thermosyphon working fluid; and
a second heat exchanger positioned along the refrigerant loop and thermally coupling the exhaust gas and the thermosyphon working fluid such that heat is transferred from the exhaust gas to the thermosyphon working fluid, and wherein the first heat exchanger is positioned vertically above the second heat exchanger such that the thermosyphon working fluid is circulated between the first heat exchanger and the second heat exchanger, at least in part, by natural convection with a gravity driven flow.

5. The conditioning system of claim 1, wherein the one or more heat removal systems include a super-ambient cooling system, the super-ambient cooling system comprises:
a coolant loop containing a working fluid;
a first heat exchanger positioned along the coolant loop and thermally coupling the exhaust gas and the working fluid such that heat is transferred from the exhaust gas to the working fluid; and
a second heat exchanger positioned along the coolant loop and thermally coupling the working fluid and ambient air such that heat is expelled from the working fluid.

6. The conditioning system of claim 5, wherein the first heat exchanger is a concentric-tube, counterflow heat exchanger that surrounds the flow path along which the exhaust gas flows, and wherein the second heat exchanger is a radiator of a vehicle.

7. The conditioning system of claim 5, wherein
the refrigerant loop of the sub-ambient cooling system is fluidly coupled with the coolant loop of the super-ambient cooling system, the working fluid being the refrigerant and being shared between the super-ambient cooling system and the sub-ambient cooling system.

8. The conditioning system of claim 1, wherein the one or more heat removal systems include, in a serial flow relationship, a heat recovery system and at least one of: a thermosyphon and a super-ambient cooling system.

9. The conditioning system of claim 1, wherein the condensate removal system comprises at least one of:
an inertial condensate separator having a plurality of vanes that respectively define condensate traps at bends in the plurality of vanes to catch condensates from the exhaust gas; and
a centrifugal condensate separator having a base housing and a central housing defining a separator chamber in which the exhaust gas swirls and separates condensates from the exhaust gas.

10. The conditioning system of claim 1, further comprising:
a gas dryer positioned downstream of the condensate removal system along the flow path, the gas dryer includes or is thermally coupled to a heat exchanger that is thermally coupled with at least one of the one or more heat removal systems so that heat removed from the exhaust gas by the at least one of the one or more heat removal systems is directed to the gas dryer.

11. The conditioning system of claim 10, wherein the gas dryer includes a desiccant media attached to a wheel that is rotated under a continuous flow of the exhaust gas and regenerated by a counter-flowing airstream heated with heat recovered from the at least one of the one or more heat removal systems.

12. The conditioning system of claim 1, wherein the one or more heat removal systems comprise:
a first thermoelectric apparatus positioned along the flow path of the exhaust gas, the first thermoelectric apparatus being arranged to utilize a temperature differential between at least one hot side electrical conductor and at least one cold side electrical conductor so as to drive an electric current along an electric circuit; and
a second thermoelectric apparatus positioned along the flow path downstream of the first thermoelectric apparatus, the second thermoelectric apparatus being arranged to utilize the electric current flowing along the electric circuit to remove heat from the exhaust gas.

13. A conditioning system, comprising:
a flow path along which an exhaust gas from a vehicle engine flows;
one or more heat removal systems positioned along the flow path for removing heat from the exhaust gas, the one or more heat removal systems comprising:
a heat recovery system having a working fluid loop containing a working fluid, a first heat exchanger positioned along the working fluid loop and thermally coupling the exhaust gas and the working fluid such that heat is transferred from the exhaust gas to the working fluid;
a super-ambient cooling system having a cooling jacket and a vehicle radiator both positioned along a coolant loop, the cooling jacket thermally couples the exhaust gas and a working fluid flowing along the coolant loop such that heat is transferred from the exhaust gas to the working fluid, the vehicle radiator thermally couples the working fluid and ambient air such that heat is expelled from the working fluid;
a condensate removal system positioned along the flow path downstream of the one or more heat removal systems, the condensate removal system having a condensate separator operable to remove moisture from the exhaust gas;
a gas dryer positioned downstream of the condensate removal system along the flow path, the gas dryer including a wheel rotatable about an axis of rotation and a desiccant positioned on the wheel; and a fluid chamber positioned downstream of the condensate removal system along the flow path, the fluid chamber having a capture medium, and wherein the capture medium of the fluid chamber and/or the gas dryer includes or is thermally coupled with a second heat exchanger positioned along the working fluid loop such that heat is transferred from the working fluid to the capture medium and/or the gas dryer.

14. A conditioning system for mobile capture, the conditioning system comprising:
   one or more heat removal systems positioned along a flow path of an exhaust gas, the one or more heat removal systems being operable to remove heat from the exhaust gas, the one or more heat removal systems including a super-ambient cooling system that comprises
      a coolant loop containing a working fluid,
      a first heat exchanger positioned along the coolant loop and thermally coupling the exhaust gas and the working fluid such that heat is transferred from the exhaust gas to the working fluid, and
      a second heat exchanger positioned along the coolant loop and thermally coupling the working fluid and ambient air such that heat is expelled from the working fluid;
   a condensate removal system positioned downstream of the one or more heat removal systems along the flow path, the condensate removal system being operable to remove moisture from the exhaust gas; and
   a gas dryer positioned downstream of the condensate removal system along the flow path, the gas dryer includes or is thermally coupled to a heat exchanger that is thermally coupled with at least one of the one or more heat removal systems so that heat removed from the exhaust gas by the at least one of the one or more heat removal systems is directed to the gas dryer.

15. The conditioning system of claim 14, wherein the first heat exchanger is a concentric-tube, counterflow heat exchanger that surrounds the flow path along which the exhaust gas flows, and wherein the second heat exchanger is a radiator of a vehicle.

16. The conditioning system of claim 14, wherein the one or more heat removal systems include a sub-ambient cooling system that comprises:
   a coolant loop fluidly coupled with the coolant loop of the super-ambient cooling system, the working fluid being shared between the super-ambient cooling system and the sub-ambient cooling system; and
   a first heat exchanger positioned along the coolant loop of the sub-ambient cooling system.

17. The conditioning system of claim 14, further comprising:
   one or more fluid chambers positioned downstream of the condensate removal system along the flow path, each one of the one or more fluid chambers defines an interior in which a capture medium is contained.

18. The conditioning system of claim 14, wherein the condensate removal system comprises at least one of:
   an inertial condensate separator having a plurality of vanes that respectively define condensate traps at bends in the plurality of vanes to catch condensates from the exhaust gas; and/or
   a centrifugal condensate separator having a base housing and a central housing defining a separator chamber in which the exhaust gas swirls and separates condensates from the exhaust gas.

* * * * *